(12) United States Patent
Huda et al.

(10) Patent No.: US 10,138,394 B2
(45) Date of Patent: Nov. 27, 2018

(54) AIR-WATER BARRIER SILICONE COATINGS

(71) Applicant: CSL Silicones Inc., Guelph (CA)

(72) Inventors: Faisal Huda, Oakville (CA); Farooq Ahmed, Guelph (CA); Jocelyn J. Johansen, Cambridge (CA); Balwantrai Mistry, Guelph (CA); Christopher W. McConnery, Kitchener (CA)

(73) Assignee: CSL Silicones Inc., Guelph (CA)

( * ) Notice: Subject to any disclaimer, the term of this patent is extended or adjusted under 35 U.S.C. 154(b) by 0 days.

(21) Appl. No.: 15/114,421

(22) PCT Filed: Mar. 19, 2015

(86) PCT No.: PCT/CA2015/050205
§ 371 (c)(1),
(2) Date: Jul. 27, 2016

(87) PCT Pub. No.: WO2015/139135
PCT Pub. Date: Sep. 24, 2015

(65) Prior Publication Data
US 2017/0009098 A1    Jan. 12, 2017

Related U.S. Application Data

(60) Provisional application No. 61/955,427, filed on Mar. 19, 2014.

(51) Int. Cl.
| | | |
|---|---|---|
| *C09D 183/04* | (2006.01) | |
| *C09D 5/00* | (2006.01) | |
| *C08G 77/16* | (2006.01) | |
| *C08K 9/06* | (2006.01) | |

(52) U.S. Cl.
CPC ............ *C09D 183/04* (2013.01); *C09D 5/00* (2013.01); *C08G 77/16* (2013.01); *C08K 9/06* (2013.01); *C08K 2201/005* (2013.01); *C08K 2201/006* (2013.01)

(58) Field of Classification Search
CPC ................................. C09D 183/04; C08K 9/06
See application file for complete search history.

(56) References Cited

U.S. PATENT DOCUMENTS

| | | | | |
|---|---|---|---|---|
| 4,297,265 A | * | 10/1981 | Olsen | C08K 3/36 524/493 |
| 4,584,324 A | * | 4/1986 | Bauman | C08J 9/0085 521/117 |
| 4,912,153 A | | 3/1990 | Jeremias et al. | |
| 5,338,783 A | * | 8/1994 | Olsen | C08K 3/36 106/287.1 |
| 5,904,988 A | | 5/1999 | Stein et al. | |
| 6,399,678 B2 | * | 6/2002 | Frankoski | B01F 7/00141 524/3 |
| 6,437,039 B1 | | 8/2002 | Ahmed et al. | |
| 6,833,407 B1 | | 12/2004 | Ahmed et al. | |
| 6,939,582 B2 | | 9/2005 | Ahmed et al. | |
| 7,232,609 B2 | | 6/2007 | Ahmed et al. | |
| 8,513,328 B2 | | 8/2013 | Dorman | |
| 8,697,818 B2 | | 4/2014 | Roscher et al. | |
| 2005/0192387 A1 | | 9/2005 | Williams et al. | |
| 2007/0244249 A1 | | 10/2007 | Correia | |
| 2007/0277697 A1 | | 12/2007 | Diamond et al. | |
| 2008/0242763 A1 | | 10/2008 | Ramakrishnan et al. | |
| 2014/0087082 A1 | | 3/2014 | Alturn et al. | |
| 2017/0044400 A1 | * | 2/2017 | Ahmed | C09D 5/1675 |

FOREIGN PATENT DOCUMENTS

| | | | |
|---|---|---|---|
| JP | H01-141951 | 6/1989 | |
| JP | H10-330688 | 12/1998 | |
| JP | 2003-509532 A | 3/2003 | |
| JP | 2005-513714 A | 5/2005 | |
| WO | 2001/018134 A1 | 3/2001 | |
| WO | 2003/051955 A1 | 6/2003 | |
| WO | 2007/146018 A1 | 12/2007 | |
| WO | 2009085032 A1 | 7/2009 | |
| WO | WO-2009085032 A1 * | 7/2009 | ............. C08G 77/26 |
| WO | 2010/086299 A1 | 8/2010 | |
| WO | 2012064611 A1 | 5/2012 | |
| WO | 2012/166692 A1 | 12/2012 | |

OTHER PUBLICATIONS

Moretto, H.-H. et al., "Silicones," Ullmann's Encyclopedia of Industrial Chemistry, vol. 32, 675-712, published online 2000.*
Wolf, R. and Kaul, B. L. "Plastics, Additives," Ullmann's Encyclopedia of Industrial Chemistry, vol. 27, 619-671, published online 2000.*
International Search Report and Written Opinion of corresponding PCT/CA2015/050205 dated Jun. 2, 2015.
Extended European Search Report from corresponding EP Pat. Appln. No. 15764931 dated Oct. 10, 2017.
Office Action cited in the corresponding Canadian Application No. 2,937,570 dated Aug. 20, 2018, 5 pages.
Office Action cited in the corresponding European Application No. 15 764 931.0 dated Jul. 17, 2018, 6 pages.
Office Action of corresponding Chinese Patent Application No. 201580014026.4 dated Mar. 8, 2018.

(Continued)

*Primary Examiner* — Nicholas E Hill
(74) *Attorney, Agent, or Firm* — Rothwell, Figg, Ernst & Manbeck, P.C.

(57) ABSTRACT

The present application discloses a one-part room temperature vulcanizable (RTV) poly(diorganosiloxane) composition for a silicone elastomer air-water barrier coating for a building envelope; a method of preparing a silicone elastomer air-water barrier coating for a building envelope using such a composition and a building envelope prepared by such a method.

24 Claims, No Drawings

(56) References Cited

OTHER PUBLICATIONS

Office Action of corresponding Canadian Patent Application No. 2,937,570 dated May 4, 2017.
Office Action of corresponding Canadian Patent Application No. 2,937,570 dated Sep. 18, 2017.
Office Action of corresponding Canadian Patent Application No. 2,937,570 dated Feb. 1, 2018.
English translation of Office Action in Japanese Patent Application No. 2016-557919 dated Oct. 2, 2018, 9 pages.

* cited by examiner

AIR-WATER BARRIER SILICONE COATINGS

This application is a National Stage of co-pending International Application No. PCT/CA2015/050205 filed Mar. 19, 2015, which claims the benefit of Provisional Application No. 61/955,427 filed Mar. 19, 2014, the contents of both of which are herein incorporated in their entirety by reference.

FIELD

The present application relates to a silicone-containing coating. In particular, the present application relates to an elastomeric silicone-containing coating for a building envelope that inhibits the passage of air and liquid water.

BACKGROUND

An air barrier system for a building envelope can minimize energy consumption by inhibiting or preventing the flow of air from both sides (i.e. in and out). Different types of air barrier systems are presently in use as air and moisture barriers in building envelopes, such as mechanically attached membranes (.e.g. polyethylene film or Tyvek™), self-adhered membranes, closed cell and open cell spray-applied polyurethane foam and fluid applied membranes that cure to solid films (e.g. polymer-based coatings and paints).

Silicone polymer-based coatings are known to have resistance against UV radiation and other environmental factors. Elastomeric silicone coatings can repel liquid water by virtue of their hydrophobic nature but they can be permeable to water vapors. The permeability of water vapor can inhibit or prevent condensation of water vapor to liquid water inside the building envelope.

Silicone-based air and water barrier compositions are known. For example U.S. Pat. No. 8,513,328 discloses a one-part room temperature vulcanizing silicone-based air and water barrier composition comprising a silanol-terminated diorganopolysiloxane polymer, a metal chelate condensation cure catalyst and a polyalkoxysilane crosslinking agent. The composition of U.S. Pat. No. 8,513,328 can further optionally comprise a treated fumed silica reinforcing filler, a stearic acid treated ground calcium carbonate extending filler or a precipitated calcium carbonate filler and an adhesion promoter.

Other one-part room temperature vulcanizing compositions have also been disclosed for use in coating applications.

For example, U.S. Pat. No. 6,437,039 discloses a one-part room temperature vulcanizable (RTV) organopolysiloxane rubber composition of a particular formulation for use as a protective coating on surfaces. U.S. Pat. No. 6,833,407 discloses a solvent free one-part RTV organopolysiloxane rubber composition of a particular formulation for use as a high gloss surface coating. U.S. Pat. No. 6,878,410 discloses a method of protecting a surface from the effects of a fire using a one-part RTV polysiloxane composition which comprises one or more fire retardant fillers. U.S. Pat. Nos. 6,939,582 and 7,232,609 disclose one-part RTV organopolysiloxane rubber compositions of particular formulations for use as a coating on high voltage electrical insulators.

SUMMARY

The present application discloses compositions which can be used to prepare silicone elastomer coatings which adhere to building materials to form an air-water barrier coating. In certain embodiments, the compositions disclosed herein represent environmentally friendly alternatives to currently available air-water barriers, for example by providing coatings that are classified as "low VOC" (volatile organic compounds).

Accordingly, the present application includes a one-part room temperature vulcanizable (RTV) poly(diorganosiloxane) composition for a silicone elastomer air-water barrier coating for a building envelope, comprising:

(a) about 10-70 wt % of a poly(diorganosiloxane) of Formula I:

wherein
R$^1$ and R$^2$ are each independently C$_{1-8}$alkyl, C$_{2-8}$alkenyl or C$_{6-10}$aryl, and
n has an average value such that the viscosity of the poly(diorganosiloxane) of Formula I is from about 100-100,000 cP at 25° C.;

(b) about 5-40 wt % of a poly(diorganosiloxane) of Formula II:

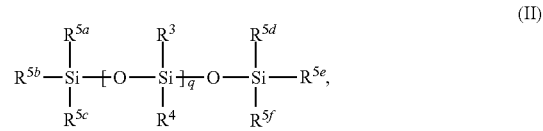

wherein
R$^3$ and R$^4$ are each independently C$_{1-8}$alkyl, C$_{2-8}$alkenyl or C$_{6-10}$aryl;
R$^{5a}$, R$^{5b}$, R$^{5c}$, R$^{5d}$, R$^{5e}$ and R$^{5f}$ are each independently C$_{1-8}$alkyl, C$_{2-8}$alkenyl or C$_{8-10}$aryl, and
q has an average value such that the viscosity of the poly(diorganosiloxane) of Formula II is from about 500-50,000 cP at 25° C., (c) about 0.5-25 wt % of an amorphous silica reinforcing filler;

(d) about 2-15 wt % of at least one cross-linking agent of Formula III:

wherein
R$^6$ is C$_{1-8}$alkyl, C$_{2-8}$alkenyl or C$_{8-10}$aryl,
m is 0, 1 or 2; and
X is a hydrolysable ketoximino-containing group of Formula IV:

wherein R$^{7a}$ and R$^{7b}$ are each independently C$_{1-8}$alkyl, C$_{2-8}$alkenyl or C$_{6-10}$aryl, or X is a hydrolysable group of Formula V:

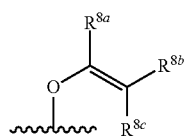

(V)

wherein $R^{8a}$, $R^{8b}$ and $R^{8c}$ are each independently H, $C_{1-8}$alkyl, $C_{2-8}$alkenyl or $C_{6-10}$aryl, (e) about 0.2-5 wt % of an adhesion agent of Formula VI:

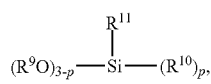

(VI)

wherein
$R^9$ and $R^{10}$ are each independently $C_{1-8}$alkyl, $C_{2-8}$alkenyl or $C_{6-10}$aryl,
$R^{11}$ is $C_{1-10}$alkyl, $C_{2-10}$alkenyl or $C_{6-10}$aryl, optionally substituted with one or more organofunctional groups; and
p is 0 or 1; and
(f) about 0.01-2 wt % of an organometallic condensation catalyst, wherein the metal of the organometallic condensation catalyst is selected from tin, titanium, zirconium, boron, zinc and bismuth,
wherein each alkyl, alkenyl and aryl group in the compounds of Formula I, II, III, IV, V and VI is optionally halo-substituted.

In an embodiment of the application, the viscosity of the poly(diorganosiloxane) of Formula I is from about 40,000-90,000 cP at 25° C.

The present application also includes a method of preparing a silicone elastomer air-water barrier coating for a building envelope, comprising:
coating a substrate with a one-part room temperature vulcanizable (RTV) poly(diorganosiloxane) composition of the present application; and
allowing the composition to cure under conditions to obtain the silicone elastomer air-water barrier coating.

The present application further includes a building envelope comprising the silicone elastomer air-water barrier coating obtained according to a method of the present application and a building envelope comprising a silicone elastomer air-water barrier coating prepared from a one-part room temperature vulcanizable (RTV) poly(diorganosiloxane) composition of the present application.

Other features and advantages of the present application will become apparent from the following detailed description. It should be understood, however, that the detailed description and the specific examples, while indicating embodiments of the application, are given by way of illustration only and the scope of the claims should not be limited by these embodiments, but should be given the broadest interpretation consistent with the description as a whole.

DETAILED DESCRIPTION

I. Definitions

Unless otherwise indicated, the definitions and embodiments described in this and other sections are intended to be applicable to all embodiments and aspects of the present application herein described for which they are suitable as would be understood by a person skilled in the art.

In understanding the scope of the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

The term "suitable" as used herein means that the selection of the particular compound or conditions would depend on the specific synthetic manipulation to be performed, and the identity of the molecule(s) to be transformed, but the selection would be well within the skill of a person trained in the art. All process/method steps described herein are to be conducted under conditions sufficient to provide the product shown. A person skilled in the art would understand that all reaction conditions, including, for example, reaction solvent, reaction time, reaction temperature, reaction pressure, reactant ratio and whether or not the reaction should be performed under an anhydrous or inert atmosphere, can be varied to optimize the yield of the desired product and it is within their skill to do so.

The expression "proceed to a sufficient extent" as used herein with reference to the reactions or method steps disclosed herein means that the reactions or method steps proceed to an extent that conversion of the starting material or substrate to product is maximized. Conversion may be maximized when greater than about 5, 10, 15, 20, 25, 30, 35, 40, 45, 50, 55, 60, 65, 70, 75, 80, 85, 90, 95 or 100% of the starting material or substrate is converted to product.

Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

As used in this application, the singular forms "a", "an" and "the" include plural references unless the content clearly dictates otherwise. For example, an embodiment including "a poly(diorganosiloxane)" should be understood to present certain aspects with one poly(diorganosiloxane) or two or more additional poly(diorganosiloxanes).

In embodiments comprising an "additional" or "second" component, such as an additional or second poly(diorganosiloxane), the second component as used herein is chemically different from the other components or first component. A "third" component is different from the other, first, and second components, and further enumerated or "additional" components are similarly different.

The term "alkyl" as used herein, whether it is used alone or as part of another group, means straight or branched chain, saturated alkyl groups. The number of carbon atoms that are possible in the referenced alkyl group are indicated by the numerical prefix "$C_{n1-n2}$". For example, the term $C_{1-8}$alkyl means an alkyl group having 1, 2, 3, 4, 5, 6, 7 or 8 carbon atoms.

The term "alkenyl" as used herein, whether it is used alone or as part of another group, means straight or branched chain, unsaturated alkenyl groups. The number of carbon atoms that are possible in the referenced alkenyl group are indicated by the numerical prefix "$C_{n1-n2}$". For example, the term $C_{2-8}$alkenyl means an alkenyl group having 2, 3, 4, 5, 6, 7 or 8 carbon atoms and at least one double bond, for example 1 to 3, 1 to 2 or 1 double bond.

The term "aryl" as used herein refers to cyclic groups that contain at least one aromatic ring. In an embodiment of the application, the aryl group contains from 6, 9 or 10 atoms, such as phenyl, naphthyl or indanyl. In another embodiment, the aryl group is a phenyl group.

The term "alkylene" as used herein, whether it is used alone or as part of another group, means straight or branched chain, saturated alkylene group; that is a saturated carbon chain that contains substituents on two of its ends. The number of carbon atoms that are possible in the referenced alkylene group are indicated by the numerical prefix "$C_{n1-n2}$". For example, the term $C_{1-8}$alkylene means an alkylene group having 1, 2, 3, 4, 5, 6, 7 or 8 carbon atoms.

The term "organofunctional group" as used herein refers to a functional grouping commonly used in organo-polymers, said group comprising carbon atoms, hydrogen atoms and/or at least one heteroatom selected from N, O and S. In an embodiment the organofunctional group is selected from amino (—NR'R"), amido (—C(O)NR'R"), epoxy

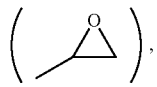

mercapto (—SR'), keto (—C(O)R'), cyanato (—CN) and isocyanato (—NCO), wherein R' and R" are independently selected from H, $C_{1-6}$alkyl and $C_{6-10}$aryl.

The term "halo" as used herein means "halogen" and includes fluorine, bromine, chlorine and iodine. In an embodiment the halo is fluorine. When the halogen is a substituent group, it is referred to as a "halide", for example "fluoride".

The term "halo-substituted' as used herein means that one or more, including all, of the available hydrogen atoms on a group are replaced with halo. Examples of a halo-substituted alkyl group are $CCl_3$, $CF_3$, $CF_2CF_3$, $CH_2CF_3$ and the like. Examples of halo-substituted aryl groups are $C_6H_5Cl$, $C_6F_5$, $C_6H_4F$ and the like.

The term "available", as in "available hydrogen atoms", refers to atoms that would be known to a person skilled in the art to be capable of replacement by, for example, a fluorine atom using methods known in the art.

The term "organosilane" as used herein refers to an organic derivative of a silane containing at least one carbon-silicon bond.

The viscosity units expressed herein refer to the viscosity of a material at 25° C. as determined using a Brookfield viscometer according to ASTM D4287.

II. Compositions

The present application discloses compositions which can be used to prepare silicone elastomer coatings which adhere to building materials to form an air-water barrier coating. Such coatings can also provide protection from UV radiation. The silicone elastomeric coatings prepared from the one-part room temperature vulcanizable (RTV) compositions of the application have also been shown to have a crack bridging ability which can, for example, accommodate movements and stresses of the building material the coating is coated on without causing a crack, rupture and/or hole in the building envelope.

Crack bridging ability of air-water barrier coatings depends upon the temperature of the surrounding environment. Temperatures below 0° C. reduce coating's ability to stretch and thus reduce its crack bridging ability. Testing standards for a coating for a building envelope are generally performed by testing the coating's crack bridging ability at −26° C. The compositions in the present application have been tested to show crack bridging ability at −40° C. The crack bridging ability of these coatings at extremely low environmental temperatures enhances the coating's performance as an air barrier coating in extremely cold weather situations The RTV composition of present application was applied to a substrate to cure to a continuous dry film. The coating film was cured at room conditions (for example, 25° C. and 50% relative humidity) to a dry film thickness of 30 mil (762 micron) for testing and evaluation. Application of a higher film thickness (for example about 20-60 mil) ensures thorough coverage of substrate surfaces whereas a lower film thickness (for example about 5-15 mil) can result in a risk of coating defects, such as voids and pin holes. Films were evaluated herein for air permeance as per ASTM E2178, water vapour permeance as per ASTM E96, water resistance as per AATCC 127 and nail sealability as per ASTM D1970 standard.

The cured film at 30 mil has a water vapour permeability between about 2.2 and about 2.9 US perm and air permeance between about $5\times10^{-4}$ and about $7\times10^{-4}$ L/s·m². The air permeance of the film exceeds the requirement of 0.02 L/s·m² specified by ASHRAE 90.1-2010.

Accordingly, the present application includes a one-part room temperature vulcanizable (RTV) poly(diorganosiloxane) composition for a silicone elastomer air-water barrier coating for a building envelope, comprising:

(a) about 10-70 wt % of a poly(diorganosiloxane) of Formula I:

wherein $R^1$ and $R^2$ are each independently $C_{1-8}$alkyl, $C_{2-8}$alkenyl or $C_{6-10}$aryl, and n has an average value such that the viscosity of the poly(diorganosiloxane) of Formula I is from about 100-100,000 cP at 25° C.;

(b) about 5-40 wt % of a poly(diorganosiloxane) of Formula II:

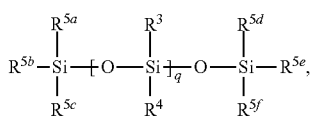

wherein
R³ and R⁴ are each independently $C_{1-8}$alkyl, $C_{2-8}$alkenyl or $C_{6-10}$aryl,
$R^{5a}$, $R^{5b}$, $R^{5c}$, $R^{5d}$, $R^{5e}$ and $R^{5f}$ are each independently $C_{1-8}$alkyl, $C_{2-8}$alkenyl or $C_{6-10}$aryl; and
q has an average value such that the viscosity of the poly(diorganosiloxane) of Formula II is from about 500-50,000 cP at 25° C.;
(c) about 0.5-25 wt % of an amorphous silica reinforcing filler;
(d) about 2-15 wt % of at least one cross-linking agent of Formula III:

wherein
R⁶ is $C_{1-8}$alkyl, $C_{2-8}$alkenyl or $C_{6-10}$aryl,
m is 0, 1 or 2; and
X is a hydrolysable ketoximino-containing group of Formula IV:

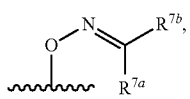

wherein $R^{7a}$ and $R^{7b}$ are each independently $C_{1-8}$alkyl, $C_{2-8}$alkenyl or $C_{6-10}$aryl, or
X is a hydrolysable group of Formula V:

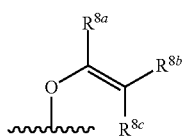

wherein $R^{8a}$, $R^{8b}$ and $R^{8c}$ are each independently H, $C_{2-8}$alkenyl or $C_{6-10}$aryl,
(e) about 0.2-5 wt % of an adhesion agent of Formula VI:

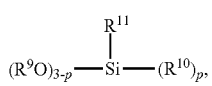

wherein
R⁹ and R¹⁰ are each independently $C_{1-8}$alkyl, $C_{2-8}$alkenyl or $C_{6-10}$aryl,
R¹¹ is $C_{1-10}$alkyl, $C_{2-10}$alkenyl or $C_{6-10}$aryl, optionally substituted with one or more organofunctional groups; and
p is 0 or 1; and
(f) about 0.01-2 wt % of an organometallic condensation catalyst, wherein the metal of the organometallic condensation catalyst is selected from tin, titanium, zirconium, boron, zinc and bismuth, wherein each alkyl, alkenyl and aryl group in the compounds of Formula I, II, III, IV, V and VI is optionally halo-substituted.

In an embodiment R¹ and R² are each independently $C_{1-8}$alkyl, $C_{2-8}$alkenyl or phenyl. In another embodiment, R¹ and R² are each independently $C_{1-6}$alkyl. In a further embodiment, R¹ and R² are each methyl.

In an embodiment, n has an average value such that the viscosity of the poly(diorganosiloxane) of Formula I is from about 50,000-100,000 cP at 25° C. In an embodiment of the application, n has an average value such that the viscosity of the poly(diorganosiloxane) of Formula I is from about 40,000-90,000 cP at 25° C. In another embodiment, n has an average value such that the viscosity of the poly(diorganosiloxane) of Formula I is from about 70,000-90,000 cP at 25° C.

In another embodiment of the present application, R¹ and R² are each methyl and n has an average value such that the viscosity of the poly(diorganosiloxane) of Formula I is from about 40,000-90,000 cP at 25° C., or about 70,000-90,000 cP at 25° C.

In an embodiment, the poly(diorganosiloxane) of Formula I is present in an amount of about 15-50 wt % or about 20-40 wt %.

In an embodiment, R³ are R⁴ are each independently $C_{1-8}$alkyl, $C_{2-8}$alkenyl or phenyl. In another embodiment, R³ are R⁴ are each independently $C_{1-6}$alkyl. In a further embodiment, R³ are R⁴ are each methyl.

In an embodiment, $R^{5a}$, $R^{5b}$, $R^{5c}$, $R^{5d}$, $R^{5e}$ and $R^{5f}$ are each independently $C_{1-8}$alkyl, $C_{2-8}$alkenyl or phenyl. In another embodiment, $R^{5a}$, $R^{5b}$, $R^{5c}$, $R^{5d}$, $R^{5e}$ and $R^{5f}$ are each independently $C_{1-6}$alkyl. In a further embodiment, $R^{5a}$, $R^{5b}$, $R^{5c}$, $R^{5d}$, $R^{5e}$ and $R^{5f}$ are each methyl.

In an embodiment, q has an average value such that the viscosity of the poly(diorganosiloxane) of Formula II is from about 500-10,000 cP at 25° C. In another embodiment, q has an average value such that the viscosity of the poly(diorganosiloxane) of Formula II is from about 500-1,500 cP at 25° C.

In another embodiment, R³, R⁴, $R^{5a}$, $R^{5b}$, $R^{5c}$, $R^{5d}$, $R^{5e}$ and $R^{5f}$ are each methyl and q has an average value such that the viscosity of the poly(diorganosiloxane) of Formula II is from about 500-1,500 cP at 25° C.

In an embodiment, the poly(diorganosiloxane) of Formula II is present in an amount of about 5-30 wt % or about 5-15 wt %.

In an embodiment, the amorphous silica reinforcing filler has a surface area of about 50-400 m²/g and a particle size range of about 0.01-0.03 microns.

In an embodiment, the amorphous silica reinforcing filler is surface treated with an organosilane, hexamethyldisilazane or polydimethylsiloxane. In another embodiment, the amorphous silica reinforcing filler is polydimethylsiloxane-treated fumed silica. Examples of suitable organosilanes include, for example, N-β-(aminoethyl)-γ-aminopropyltrimethoxysilane, γ-aminopropyltrimethoxysilane, γ-aminopropyltriethoxysilane, N-β-(aminoethyl)-γ-aminopropylmethyldimethoxysilane, γ-glycidoxypropyltrimethoxysilane, vinyltrimethoxysilane, γ-mercaptopropyltrimethoxysilane, methyltrimethoxysilane, n-octyltrimethoxysilane, γ-chloropropyltrimethoxysilane, γ-methacryloxypropyltrimethoxysilane, γ-isocyanatopropyltriethoxysilane, γ-isocyanatopropyltrimethoxysilane, (tridecafluoro-1,1,2,2-tetrahydrooctyl)triethoxysilane, and 3-(heptafluoroisopropoxy)propyltrimethoxysilane, and mixtures thereof.

In an embodiment, the amorphous silica reinforcing filler is present in an amount of about 0.5-10 wt % or about 1-5 wt %.

In an embodiment, the cross-linking agent of Formula III is a cross-linking agent of Formula IIIa:

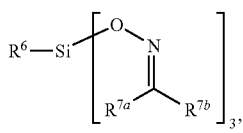
(IIIa)

wherein $R^6$ is $C_{1-8}$alkyl, $C_{2-8}$alkenyl or $C_{6-10}$aryl, and $R^{7a}$ and $R^{7b}$ are each independently $C_{1-8}$alkyl, $C_{2-8}$alkenyl or $C_{6-10}$aryl.

In another embodiment, $R^6$ is $C_{1-8}$alkyl, $C_{2-8}$alkenyl or phenyl. In a further embodiment, $R^6$ is $C_{1-6}$alkyl. It is an embodiment that $R^6$ is methyl.

In another embodiment, $R^{7a}$ and $R^{7b}$ are each independently $C_{1-8}$alkyl, $C_{2-8}$alkenyl or phenyl. In a further embodiment, $R^{7a}$ and $R^{7b}$ are each independently $C_{1-6}$alkyl. It is an embodiment that $R^{7a}$ is methyl and $R^{7b}$ is ethyl.

In another embodiment, the cross-linking agent of Formula III is a cross-linking agent of Formula IIIa, $R^6$ and $R^{7a}$ are methyl and $R^{7b}$ is ethyl.

In an embodiment, the cross-linking agent of Formula III is a cross-linking agent of Formula IIIb:

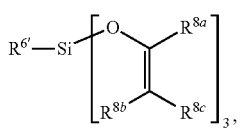
(IIIb)

wherein $R^{6'}$ is $C_{1-8}$alkyl, $C_{2-8}$alkenyl or $C_{6-10}$aryl; and $R^{8a}$, $R^{8b}$ and $R^{8c}$ are each independently H, $C_{1-6}$alkyl, $C_{2-8}$alkenyl or $C_{6-10}$aryl.

In another embodiment, $R^{6'}$ is $C_{1-8}$alkyl, $C_{2-8}$alkenyl or phenyl. In a further embodiment, $R^{6'}$ is $C_{2-6}$alkenyl. It is an embodiment that $R^{6'}$ is vinyl.

In another embodiment, $R^{8a}$, $R^{8b}$ and $R^{8c}$ are each independently H, $C_{1-8}$alkyl, $C_{2-8}$alkenyl or phenyl. In a further embodiment, $R^{8a}$, $R^{8b}$ and $R^{8c}$ are each independently H and $C_{1-6}$alkyl. It is an embodiment that $R^{8a}$ is methyl and $R^{8b}$ and $R^{8c}$ are both H.

In an embodiment, the cross-linking agent of Formula III is present in an amount of about 2-10 wt % or about 2-6 wt %.

In another embodiment of the present application, the adhesion agent of Formula VI is an adhesion agent of Formula VIa:

$(R^9O)_3—Si—R^{11}$ (VIa), wherein $R^9$ is $C_{1-8}$alkyl, $C_{2-8}$alkenyl or $C_{6-10}$aryl, and $R^{11}$ is $C_{1-10}$alkyl, $C_{2-10}$alkenyl or $C_{6-10}$aryl, optionally substituted with one or more groups selected from —NR'R", —C(O)NR'R"),

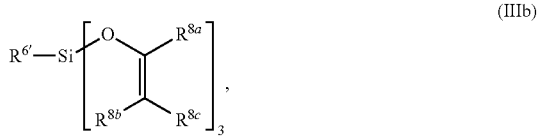
(IIIb)

—SR', —C(O)R', —CN and

—NCO, wherein R' and R" are independently selected from H, $C_{1-6}$alkyl and $C_{6-10}$aryl.

In an embodiment, $R^9$ is $C_{1-8}$alkyl, $C_{2-8}$alkenyl or phenyl. In a further embodiment, $R^9$ is $C_{1-6}$alkyl. It is an embodiment that $R^9$ is ethyl.

In another embodiment, $R^{11}$ is $C_{1-10}$alkyl, $C_{2-10}$alkenyl or $C_{6-10}$aryl, optionally substituted with —NR'R", wherein R' and R" are independently selected from H, $C_{1-4}$alkyl and phenyl. In a further embodiment, $R^{11}$ is $C_{1-10}$alkyl, $C_{2-10}$alkenyl or phenyl substituted with —NR'R", wherein R' and R" are independently selected from H, $C_{1-4}$alkyl and phenyl. It is an embodiment that $R^{11}$ is $C_{1-8}$alkyl substituted with —NR'R", wherein R' and R" are independently selected from H, $C_{1-4}$alkyl and phenyl. In another embodiment, $R^{11}$ is $C_{1-8}$alkylene-NH$_2$. In a further embodiment, $R^{11}$ is —(CH$_2$)$_3$NH$_2$.

In another embodiment, the adhesion agent of Formula VI is an adhesion agent of Formula VIa, $R^9$ is ethyl and $R^{11}$ is —(CH$_2$)$_3$NH$_2$.

In an embodiment, the adhesion agent is present in an amount of about 0.5-4 wt % or about 0.5-2 wt %

In another embodiment, the organometallic condensation catalyst is an organotin condensation catalyst. In another embodiment, the organometallic condensation catalyst is selected from dibutyltin dilaurate, dioctyltin di-(2-ethylhexanoate), dioctyltin dilaurate, lauryl stannoxane, dibutyltin diketonoate, dibutyltin diacetate, dibutyltin bis-(isooctyl maleate), dioctyltin dineodecanoate and dimethyltin dineodecanoate, and mixtures thereof.

In an embodiment, the organometallic condensation catalyst is present in an amount of about 0.05-1 wt % or about 0.05-0.5 wt %.

In another embodiment, the composition further comprises an extending filler. In an embodiment, the composition comprises about 5-60 wt % of an extending filler selected from calcium carbonate, calcium silicate, titanium dioxide, zirconium dioxide, chromium dioxide, antimony oxide, exfoliated graphite, barium sulfate, quartz silica, diatomaceous earth, aluminum hydroxide, ceramic microspheres, wollastonite, melamine, zinc borate, zinc oxide, iron oxide, hollow glass microspheres, hollow ceramic microspheres, fly ash, and mixtures thereof. In embodiment, the extending filler is surface treated, for example with, an organosilane, hexamethyldisilazane or polydimethylsiloxane. Examples of suitable organosilanes include, for example, N-β-(aminoethyl)-γ-aminopropyltrimethoxysilane, γ-aminopropyltrimethoxysilane, γ-aminopropyltriethoxysilane, N-β-(aminoethyl)-γ-aminopropylmethyldimethoxysilane, γ-glycidoxypropyltrimethoxysilane, vinyltrimethoxysilane, γ-mercaptopropyltrimethoxysilane, methyltrimethoxysilane, n-octyltrimethoxysilane, γ-chloropropyltrimethoxysilane, γ-methacryloxypropyltrimethoxysilane, γ-isocyanatopropyltriethoxysilane, γ-isocyanatopropyltrimethoxysilane, (tridecafluoro-1,1,2,2-tetrahydrooctyl) triethoxysilane, and 3-(heptafluoroisopropoxy) propyltrimethoxysilane, and mixtures thereof.

In another embodiment, the extending filler is calcium carbonate. In a further embodiment, the extending filler is stearic acid-treated calcium carbonate. It will be appreciated by a person skilled in the art that extending fillers can, for example, increase the resistance of a coating prepared from the composition to environmental effects. In a further embodiment, an extending filler that is also a fire retardant is selected. Examples of such fillers include, for example, melamine, zirconium dioxide, chromium dioxide, zinc borate, antimony oxide and exfoliated graphite. The selection of a suitable extending filler will depend, for example, on the environment in which the coating is used and the selection of a suitable extending filler can be made by a person skilled in the art.

In an embodiment, the extending filler is present in an amount of about 10-45 wt % or about 20-30 wt %.

In another embodiment, the composition further comprises a solvent. In an embodiment, the solvent is a volatile organic compound (VOC) exempt solvent, for example, hexamethyldisiloxane, p-chlorobenzyltrifluoride (PCBTF), t-butyl acetate and/or octamethyltrisiloxane. In an embodiment, the composition further comprises about 1-40 wt % solvent selected from an organic solvent and a methylated silicone solvent. In an embodiment, the organic solvent comprises, consists essentially of or consists of petroleum naptha. In another embodiment, the methylated silicone solvent is a VOC exempt methylated silicone solvent such as hexamethyldisiloxane and octamethyltrisiloxane. In an embodiment, the solvent is present in an amount of about 10-25 wt %.

In an embodiment, the composition further comprises a pigment. In another embodiment, the pigment is present in an amount of about 0.1-10 wt %.

In an embodiment, the composition further comprises a biocide. In a further embodiment, the biocide is isothiazolinone or an isothiazolinone analog, such as methylisothiazolinone, diiodomethyl-p-tolylsulfone, nano grade silver, quaternary ammonium functionalized organosilane and benzisothiazolinone.

II. Methods

The present application also includes a method of preparing a silicone elastomer air-water barrier coating for a building envelope, comprising:
  coating a substrate with a one-part room temperature vulcanizable (RTV) poly(diorganosiloxane) composition of the present application; and
  allowing the composition to cure under conditions to obtain the silicone elastomer air-water barrier coating.

In an embodiment, the substrate comprises concrete, optionally coated with a sealant, drywall, oriented strand board (OSB), gypsum (interior and exterior) fiberboard, chipboard, closed-cell extruded polystyrene foam, wood, stainless steel, carbon steel, galvanized steel, glass, metal cladding, aluminum, or coarse textured exterior insulation and finishing system (EIFS), or any other suitable material of which a building can be constructed.

In an embodiment, prior to the step of coating, the composition is prepared by mixing the components of the composition. It will be appreciated by a person skilled in the art that the catalysts, cross-linking agents and the adhesion agents are moisture sensitive therefore the composition is typically maintained substantially free of moisture until it is desired to cure the composition.

In an embodiment, the composition is prepared by mixing all ingredients of the coating formulation in a pot with the help of a combination of planetary and high shear mixers under inert nitrogen atmosphere until homogenous consistency is achieved. In an embodiment, viscosity and sag resistance of the coating formulation is monitored by withdrawing samples periodically during mixing. In an embodiment, the prepared composition is dispensed into vessels which can be sealed and optionally stored prior to use.

It will be appreciated by a person skilled in the art that the substrate can be coated by any suitable means for coating a substrate with a one-part room temperature vulcanizable (RTV) poly(diorganosiloxane) composition and the selection of a suitable means for a particular substrate and/or application can be made by a person skilled in the art. For example, the composition is coated on the substrate via spraying, brushing, rolling, trowelling, calendaring, a squeegee and/or an air knife. In an embodiment, the composition is coated on a substrate via spraying.

In an embodiment, the conditions to obtain the silicon elastomer air-water barrier coating comprise subjecting the composition to an ambient atmosphere for a time and temperature until the curing of the composition has proceeded to a sufficient extent, for example a time of about 40 minutes to about 7 days or about 0.5 hours to about 2 hours at a temperature of about −20° C. to about 75° C. or about −13° C. to about 32° C. In an embodiment, the relative humidity is from about 45% to about 70% or about 40% to about 60%.

III. Building Envelopes

The present application further includes a building envelope comprising the silicone elastomer air-water barrier coating obtained according to a method of the present application and a building envelope comprising a silicone elastomer air-water barrier coating prepared from a one-part room temperature vulcanizable (RTV) poly(diorganosiloxane) composition of the present application.

In an embodiment, the compositions of the present application are tested for use as a coating within the building envelope components using a whole building hygrothermal model. As part of the whole building hygrothermal model, the envelope's material properties, such as density, sorption, vapor permeability, liquid diffusivity, thermal conductivity, heat capacity and air permeability are investigated in a building envelope model, for example as described in T. Fitsum, "Whole Building Heat and Moisture Analysis", Housing Studies Achievement Award, 2009, CMHC.

The following non-limiting examples are illustrative of the present application:

Example 1: Preparation of an Exemplary Air Barrier Composition

Air barrier composition A was prepared in a mixer equipped with planetary and high shear disperser blades by incorporating 25 parts by weight of stearic acid-treated calcium carbonate to a blend of 32.7 parts by weight of silanol-terminated poly(dimethylsiloxane) (80,000 cP at 25° C.) and 11.8 parts by weight of trimethyl-silyl-terminated poly(dimethylsiloxane) (1,000 cP at 25° C.). Then, 20 parts by weight of petroleum naptha solvent was added. Then 3.5 parts by weight of methyl tris(methylethylketoxime)silane was added and mixed under nitrogen atmosphere, followed by the addition of 1 part by weight of 3-aminopropyltriethoxysilane which was also mixed under nitrogen atmosphere. Then 3.7 parts by weight of pigment was added and mixed until well dispersed. Then 2.2 parts by weight of poly(dimethylsiloxane)-treated fumed silica was added and thoroughly mixed in. Lastly, 0.1 parts by weight of dibutyltin dilaurate catalyst was mixed into the coating until a uniform consistency was achieved.

Example 2: Preparation of an Exemplary Air Barrier Composition

Air barrier composition B was prepared in a mixer equipped with planetary and high shear disperser blades by incorporating 25 parts by weight of stearic acid-treated calcium carbonate to a blend of 32.7 parts by weight of silanol-terminated poly(dimethylsiloxane) (80,000 cP at 25° C.) and 11.8 parts by weight of trimethyl-silyl-terminated poly(dimethylsiloxane) (1,000 cP at 25° C.). Then, 20 parts by weight of hexamethyldisiloxane was added. Then 3.5 parts by weight of methyl tris(methylethylketoxime)silane was added and mixed under nitrogen atmosphere, followed by the addition of 1 part by weight of 3-aminopropyltriethoxysilane which was also mixed under nitrogen atmosphere. Then 3.7 parts by weight of pigment was added and mixed until well dispersed. Then 2.2 parts by weight of poly(dimethylsiloxane)-treated fumed silica was added and thoroughly mixed in. Lastly, 0.1 parts by weight of dibutyltin dilaurate catalyst was mixed into the coating until a uniform consistency was achieved.

Example 3: Testing of the Compositions of the Application

Table 1 provides a summary of the coating and air barrier properties of the compositions prepared according to Example 1 and 2 including results for compliance testing against industry recognized standards such as those specified by the Air Barrier Association of America.

Example 4: Crack Bridging Test

Air barrier membranes desirably maintain waterproofing and air barrier properties under stresses that a building could encounter in its lifetime, such as cracks in the substrate on which the air barrier is applied that may form as a result of temperature extremes or other forms of building movement. The crack bridging ability of the cured membranes of the compositions prepared according to Example 1 and 2 were measured in accordance with ASTM C1305. The standard currently specifies that the dry film thickness of the membrane must be 60 mils. Despite the commonly acknowledged soft and rubbery properties of silicone, substantial elastomeric properties are required in an air barrier coating formulation in order to bridge a crack of ⅛" at −26° C. as mandated by the standard. A comparison of crack bridging ability amongst other prior art coatings is provided in Table 2.

To further stress the air barrier membranes, the crack bridging test was completed at thinner dry film thicknesses using a modified method at −40° C. The air barrier compositions A and B passed under the rigorous conditions whereas Momentive SilShield™ AWB (believed to be the commercial product detailed in U.S. Pat. No. 8,513,328), failed at the manufacturer's recommended film thickness (Table 3). It is desirable to evaluate the membranes at a film thickness which will be applied in the field in order to obtain an understanding of how the material will perform under realistic conditions. Application of higher film thicknesses ensures thorough coverage of substrate surface whereas low film thickness involves risk of coating defects, such as voids and pin holes.

Example 5: Water Vapor Permeance

Air barrier membranes are also evaluated for their water vapor permeance. While all air barriers desirably prohibit the transfer of air through the material, they may retard water vapor to various degrees and are therefore classified based on their water vapor permeance. Different water vapor permeance values are desirable depending on the climate zone in which the air barrier membrane is installed.

The standard test method for water vapor transmission rate of materials (ASTM E96) measures the water vapor permeance performance of the material by determining the rate of water vapor transmission through unit area of a flat membrane induced by unit vapor pressure difference between two specific surfaces under specified temperature and humidity conditions. Vapor retarder membranes can be classified as non-permeable (class I) if the permeance is <0.1 perm; as semi-impermeable (class II) if the permeance is 0.1-1 perm; as semi-permeable (class III) if the permeance is 1-10 perm and vapor permeable if the permeance is >10 perm. The standard lists two methods, the desiccant method or the water method. It is common in the industry for air barriers to be classified by their vapor permeance measured using the wet cup method; however, it has been argued that the desiccant method is more representative of field conditions because it measures the transfusion of vapor from the air through the material and not on a standing cup of water to ensure diffusion. The water method actually allows for the formation of water droplets on the surface of the membrane which permits vapor to pass through the material through direct contact. Given the placement of the air barrier membranes within the building envelope, there is a low incidence of liquid water contact on the air barrier membrane. Therefore, it is desirable to carefully consider the water vapor retarder classification in combination with the water vapor permeance values measured using the desiccant method to obtain a full understanding the material performance characteristics under realistic conditions.

The air barrier compositions A and B described in Examples 1 and 2, maintain their semi-permeable classification when evaluated under both the water and desiccant methods, unlike many of the prior art semi-permeable liquid applied air barrier products on the market (Table 4). The prior art values reported in Table 4 were obtained from the Air Barrier Association of America's Master document entitled Fluid-Applied Membrane Air Barrier 072726 (Date of Issue: Nov. 17, 2014 D-115-009 Rev 14-1 ABAA 072726 Fluid-Applied Membrane Specification). A contributing factor to the loss of vapor permeability when using the dry cup method for these competitor products is due to the fact that they are water-based coatings. These coatings have a greater propensity for vapor permeability in the wet cup method due to their increased compatibility with water. Given so few coatings on the market are capable of obtaining semi-permeable properties under realistic conditions differentiates the air barrier compositions described in Example 1 and 2 and highlights them as being ideal for climate zones which require a degree of vapor permeability.

While the present application has been described with reference to examples, it is to be understood that the scope of the claims should not be limited by the embodiments set forth in the examples, but should be given the broadest interpretation consistent with the description as a whole.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

TABLE 1

Summary of Air Barrier Membrane Properties

| Property (units) | Composition A | Composition B | Conditions/Method |
|---|---|---|---|
| Skin over (minutes) | 40 | 23 | At 25° C. and 50% Relative Humidity (RH). |
| Tack free (minutes) | 65 | 55 | ASTM C679 |
| Viscosity (cP) | 6,000 | 6,000 | Brookfield, Spindle #3, 100 rpm, ASTM D4287 |
| Solids content (wt %) | 77 | 78 | ASTM D2369 |
| Solids content (vol %) | 67 | 68 | ASTM D2697 |
| Sag (mil) | 50-60 | 50-60 | ASTM 4400 |
| VOC (g/L) | 255 | 28 | ASTM D2369 (A); ASTM D6886 (B) |
| Tensile strength (psi) | 160 | 161 | ASTM D 412 Die D |
| Elongation (%) | 430 | 548 | ASTM D 412 Die D |
| Pull adhesion at 30 mil DFT (psi) | Concrete >65 Plywood >99 Gypsum >30 | Concrete >65 Plywood >100 Gypsum >30 | ASTM D4541 |
| Peel adhesion (ppi) | Concrete >13 Plywood >9 Gypsum >3 | Concrete >13 Plywood >9 Gypsum >3 | ASTM C794 |
| Crack bridging ability | Pass | Pass | ASTM C 1305 |
| Water vapor permeance at 30 mil DFT (US perm) | 2.9 | 2.5 | ASTM E96 (Desiccant Method A) |
| Water vapor permeance at 30 mil DFT (US perm) | 2.7 | 2.2 | ASTM E96 (Water Method B) |
| Air permeance at 30 mil DFT (L/s · m$^2$) | 0.0007 | 0.0005 | ASTM E 2178 |
| Water resistance at 30 mil DFT | Pass | Pass | AATCC 127 |
| Nail sealability at 30 mil DFT | Pass | Pass | ASTM D1970, Section 7.9 |

TABLE 2

Crack Bridging Ability Results as per ASTM C1305

| Coating | Elongation | Crack Bridging Ability |
|---|---|---|
| Prior Art Coating 1[a] | 180% | Fail |
| Prior Art Coating 2[a] | 100% | Fail |
| Air Barrier Composition A | 430% | Pass |
| Air Barrier Composition B | 548% | Pass |

[a]See U.S. Pat. No. 6,437,039

TABLE 3

Crack Bridging Ability of thin films as per modified ASTM C1305 at −40° C.

| Coating | Dry Film Thickness | Crack Bridging Ability |
|---|---|---|
| Air Barrier Composition A | 30 mil | Pass |
| Air Barrier Composition B | 30 mil | Pass |
| Momentive SilShield ™ AWB[a] | 17 mil | Fail |

[a]See U.S. Pat. No. 8,513,328

TABLE 4

Water Vapor Permeance Results as per ASTM E96 for semi-permeable air barrier coatings

| Coating | Film thickness | WVP[a] (Desiccant Method) | WVP (Water Method) |
|---|---|---|---|
| Air Barrier Composition A | 30 mil (dry) | 2.94 perm[b] | 2.73 perm |
| Air Barrier Composition B | 30 mil (dry) | 2.46 perm | 2.20 perm |
| Parex USA WeatherSeal[c] | 30 mil (wet) | 0.83 perm | — |
|  | 18 mil (wet) | — | 9.2 perm |
| Prosoco R-Guard Spray Wrap[c] | 12 mil (wet) | 1.87 perm | 8.40 perm |
| Sto Sto Gold Coat ®[c] | 12 mil (wet) | 0.12 perm | 3.54 perm |
| Momentive SilShield ™ AWB[c] | 17 mil (dry) | 4.27 perm | 5.49 perm |
| WR Meadows Air-Shield ™ LMP[c] | 30 mil (dry) | 0.24 permo | 7.00 perm |

[a]WVP = Water Vapor Permeance
[b]perm = US perm
[c]values taken from Air Barrier Association of America's Master document entitled Fluid-Applied Membrane Air Barrier - 072726 (Date of Issue: Nov. 17, 2014 D-115-009 Rev 14-1 ABAA 072726 Fluid-Applied Membrane Specification)

The invention claimed is:

1. A one-part room temperature vulcanizable (RTV) poly(diorganosiloxane) composition comprising:
   (a) about 10-70 wt % of a poly(diorganosiloxane) of Formula I:

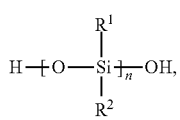

(I)

wherein
   $R^1$ and $R^2$ are each independently $C_{1-8}$alkyl, $C_{2-8}$alkenyl or $C_{6-10}$aryl; and
   n has an average value such that the viscosity of the poly(diorganosiloxane) of Formula I is from about 40,000-90,000 cP at 25° C.;

(b) about 5-40 wt % of a poly(diorganosiloxane) of Formula II:

$$R^{5b}-\underset{R^{5c}}{\underset{|}{\overset{R^{5a}}{\overset{|}{Si}}}}-[O-\underset{R^{4}}{\underset{|}{\overset{R^{3}}{\overset{|}{Si}}}}]_{q}-O-\underset{R^{5f}}{\underset{|}{\overset{R^{5d}}{\overset{|}{Si}}}}-R^{5e}, \qquad (II)$$

wherein $R^3$ and $R^4$ are each independently $C_{1-8}$alkyl, $C_{2-8}$alkenyl or $C_{6-10}$aryl;

$R^{5a}$, $R^{5b}$, $R^{5c}$, $R^{5d}$, $R^{5e}$ and $R^{5f}$ are each independently $C_{1-8}$alkyl, $C_{2-8}$alkenyl or $C_{6-10}$aryl; and q has an average value such that the viscosity of the poly(diorganosiloxane) of Formula II is from about 500-50,000 cP at 25° C.;

(c) about 0.5-25 wt % of an amorphous silica reinforcing filler;

(d) about 2-15 wt % of at least one cross-linking agent of Formula III:

$$(X)_{4-m}-Si-R^{6}_{m} \qquad (III),$$

wherein $R^6$ is $C_{1-8}$alkyl, $C_{2-8}$alkenyl or $C_{6-10}$aryl;

m is 0, 1 or 2; and

X is a hydrolysable ketoximino-containing group of Formula IV:

(IV)

wherein $R^{7a}$ and $R^{7b}$ are each independently $C_{1-8}$alkyl, $C_{2-8}$alkenyl or $C_{6-10}$aryl;

or

X is a hydrolysable group of Formula V:

(V)

wherein $R^{8a}$, $R^{8b}$ and $R^{8c}$ are each independently H, $C_{1-8}$alkyl, $C_{2-8}$alkenyl or $C_{6-10}$aryl;

(e) about 0.2-5 wt % of an adhesion agent of Formula VI:

$$(R^{9}O)_{3-p}-\underset{|}{\overset{R^{11}}{\overset{|}{Si}}}-(R^{10})_{p}, \qquad (VI)$$

wherein $R^9$ and $R^{10}$ are each independently $C_{1-8}$alkyl, $C_{2-8}$alkenyl or $C_{6-10}$aryl;

$R^{11}$ is $C_{1-10}$alkyl, $C_{2-10}$alkenyl or $C_{6-10}$aryl, optionally substituted with one or more organofunctional groups;

p is 0 or 1; and (f) about 0.01-2 wt % of an organometallic condensation catalyst, wherein the metal of the organometallic condensation catalyst is selected from tin, titanium, zirconium, boron, zinc and bismuth; and (g) about 1-40 wt % of a solvent, wherein each alkyl, alkenyl and aryl group in the compounds of Formula I, II, III, IV, V and VI is optionally fluoro-substituted, and wherein the composition has a viscosity suitable for application by spraying as a uniform and continuous film that produces a cured film that passes a crack bridging test performed according to ASTM C1305, and the composition has properties suitable for a silicone elastomeric air-water barrier coating for building materials.

2. The composition of claim 1, wherein $R^1$ and $R^2$ are each methyl and n has an average value such that the viscosity of the poly(diorganosiloxane) of Formula I is from about 70,000-90,000 cP at 25° C.

3. The composition of claim 1, wherein the poly(diorganosiloxane) of Formula I is present in an amount of about 20-40 wt %.

4. The composition of claim 1, wherein $R^3$, $R^4$, $R^{5a}$, $R^{5b}$, $R^{5c}$, $R^{5d}$, $R^{5e}$ and $R^{5f}$ are each methyl and q has an average value such that the viscosity of the poly(diorganosiloxane) of Formula II is about 500-1,500 cP at 25° C.

5. The composition of claim 1, wherein the poly(diorganosiloxane) of Formula II is present in an amount of about 5-15 wt %.

6. The composition of claim 1, wherein the amorphous silica reinforcing filler has a surface area of about 50-400 $m^2/g$ and a particle size range of about 0.01-0.03 microns.

7. The composition of claim 1, wherein the amorphous silica reinforcing filler is surface treated with an organosilane, hexamethyldisilazane or polydimethylsiloxane.

8. The composition of claim 1, wherein the amorphous silica reinforcing filler is present in an amount of about 1-5 wt %.

9. The composition of claim 1, wherein the cross-linking agent is a cross-linking agent of Formula IIIa:

(IIIa)

$$R^{6}-Si-\left[O\underset{R^{7a}}{\overset{N}{\diagdown}}R^{7b}\right]_{3},$$

wherein $R^6$, $R^{7a}$ and $R^{7b}$ are as defined in claim 1.

10. The composition of claim 1, wherein the adhesion agent is an adhesion agent of Formula VIa:

$$(R^{9}O)_{3}-Si-R^{11} \qquad (VIa),$$

wherein $R^9$ and $R^{11}$ are as defined in claim 1.

11. The composition of claim 10, wherein $R^9$ is ethyl and $R^{11}$ is $(CH_2)_3NH_2$.

12. The composition of claim 1, wherein the organometallic condensation catalyst is dibutyltin dilaurate, dioctyltin di-(2-ethylhexanoate), dioctyltin dilaurate, lauryl stannoxane, dibutyltin diketonoate, dibutyltin diacetate, dibutyltin bis-(isooctyl maleate), dioctyltin dineodecanoate or dimethyltin dineodecanoate, or a mixture thereof.

13. The composition of claim 1, wherein the organometallic condensation catalyst is present in an amount of about 0.05-0.5 wt %.

14. The composition claim 1, further comprising about 5-60 wt % of an extending filler selected from calcium carbonate, calcium silicate, barium sulfate, titanium dioxide, zirconium dioxide, chromium dioxide, antimony oxide, exfoliated graphite, quartz silica, diatomaceous earth, aluminum hydroxide, ceramic microspheres, hollow glass microspheres, hollow ceramic microspheres, fly ash, wollastonite, melamine, zinc borate, zinc oxides, iron oxide, titanium dioxide and mixtures thereof, each of which is optionally surface treated with an organosilane, hexamethyldisilazane or polydimethylsiloxane.

15. The composition of claim 14, wherein the extending filler is stearic acid-treated calcium carbonate.

16. The composition of claim 14, wherein the extending filler is present in an amount of about 20-30 wt %.

17. The composition of claim 1, wherein the solvent is selected from an organic solvent and a methylated silicone solvent.

18. The composition of claim 1, comprising about 10-25 wt % of solvent.

19. The composition of claim 1, wherein the composition produces a cured film having an elongation of between about 430% and about 550% at room temperature as determined using ASTM D412.

20. The composition of claim 1, having a viscosity of around 6000 cP at 25° C. as determined using ASTM D4287.

21. The composition of claim 1, wherein the composition produces a cured film that is classified as semi-permeable using both water and dessicant methods according to ASTM E96.

22. A building material comprising the composition of claim 1.

23. A method of preparing a silicone elastomeric air-water barrier coating for a building material, the method comprising:
    coating a building material with a composition according to claim 1; and
    allowing the composition to cure under conditions to obtain the silicone elastomer air-water barrier coating.

24. The method of claim 23, wherein the building material comprises concrete, optionally coated with a sealant, drywall, oriented strand board (OSB), gypsum, fiberboard, chipboard, closed-cell extruded polystyrene foam, wood, stainless steel, carbon steel, galvanized steel, glass, metal cladding, aluminum, and exterior insulation and finishing system (EIFS).

* * * * *